UNITED STATES PATENT OFFICE.

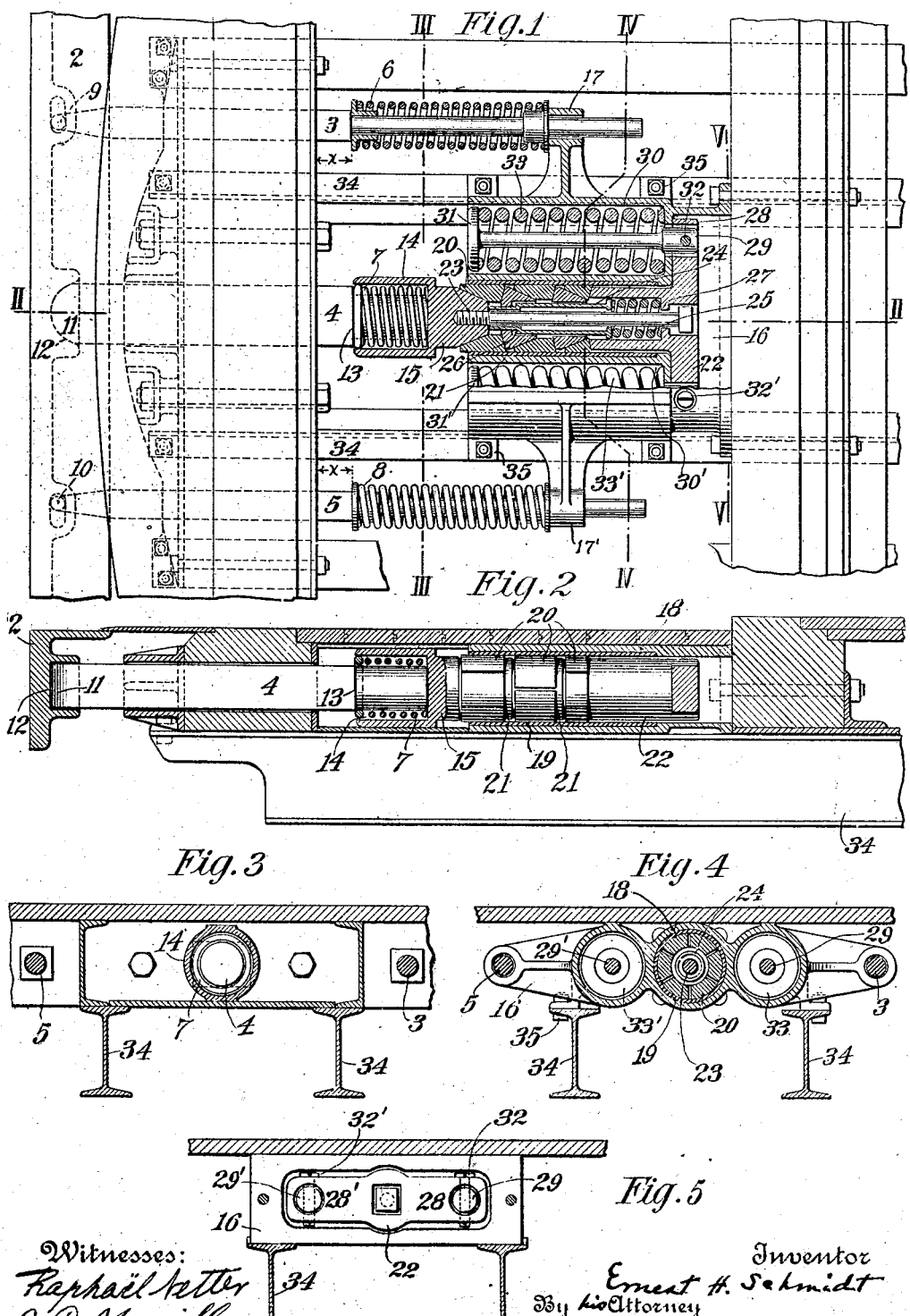

ERNEST H. SCHMIDT, OF CLEVELAND, OHIO, ASSIGNOR TO THE NATIONAL MALLEABLE CASTINGS COMPANY.

FRICTION-BUFFER.

1,202,008.  Specification of Letters Patent.  Patented Oct. 17, 1916.

Application filed July 29, 1912. Serial No. 712,048.

*To all whom it may concern:*

Be it known that I, ERNEST H. SCHMIDT, a citizen of the United States, and a resident of Cleveland, Cuyahoga county, Ohio, have invented a new and Improved Friction-Buffer, of which the following is a specification, reference being had to the accompanying drawings, in which—

Figure 1 is a plan, partly in section of my improved mechanism showing its application to under-framing of a car; Fig. 2 is a section on lines II—II of Fig. 1; Fig. 3 is a section on lines III—III of Fig. 1; Fig. 4 is a section on lines IV—IV of Fig. 1; and Fig. 5 is a section on lines V—V of Fig. 1.

My invention relates to friction buffers for use on passenger cars and the like, and is designed to provide a shock cushion for resisting the rearward movement of the buffer face of the car or platform when under buffing stress.

Referring to the drawings, the buffer plate 2 is mounted on three stems 3, 4 and 5, each of which stems is actuated by springs 6, 7 and 8. The chief function of all three of these springs is to press the buffer forwardly beyond the coupling line, so that, when coupled with an adjacent car it will be forced rearwardly to a certain extent against this spring compression and so will always maintain contact with the buffer of an opposing car.

Fig. 1 shows the position of the buffer when it is in contact with the buffer of a coupled car, it having been forced rearwardly by the distance $x$ against the pressure of the springs 6, 7 and 8. The springs 6 and 8 have the additional function of allowing either side of the buffer plate to yield rearwardly independently of the other and so to maintain contact with the opposing buffer plate when the cars angle with each other in passing around curves.

The buffer plate 2 has slots for the reception of the bearings 9 and 10 which are formed on the forward ends of the stems 3 and 5, and the stem 4 has at its forward end a rounded bearing 11 which fits in the socket 12 of the buffer plate 2, about which socket the buffer plate may oscillate when the cars angle with each other. At the rear end of the plunger 4 is a shoulder 13, which bears against the spring 7 lying within the socket portion 14 of the front follower or wedge member 15 of the friction buffer proper. The spring 7 assists the springs 6 and 8 in keeping the buffer plate 2 pressed outwardly, and also keeps the plunger 4 in tight contact therewith, and in position to transmit heavy shocks of buffing about to be described.

Preferably cast integral with the buffer housing 16 are brackets 17, 17' within which are slidably mounted the rear ends of the stems 3 and 5 respectively. The housing 16 has a central casing or chamber 18, preferably of cylindrical shape, which has on its interior a hardened steel bearing surface 19. Bearing against the surface 19 are a plurality of sets of segmental rings 20, and within these segmental rings 20 are the cone rings 21, which space apart the different sets of segmental rings 20, and bearing against the rear set of segmental rings is the equalizer follower 22. The front follower 15 has a rearward extension 23, preferably integral therewith, which enters between the outer inclined wedging faces of the foremost set of segments 20. Abutting against the rearwardly extending portion 23 of the front follower 15 is a sleeve 24, against the rear end of which bears the releasing spring 25. The sleeve 24 has a shoulder 26 which is adapted during the releasing operation to strike against the foremost cone ring 21. The spring 25 at its rear end bears against an abutment 27 on the equalizer follower 22. The equalizer follower 22 has arms 28—28' extending at right angles to the axis of the chamber 18, which arms have apertures therein for the reception of the plungers 29—29', which operate in the supplementary chambers 30—30'. The plungers have enlarged heads 31—31' at their forward ends, and are secured at their rear ends to the arms 28—28' by means of the pins 32—32'. Upon the plungers 29—29' are coiled the springs 33—33', which bear at their forward ends against the heads 31—31', and at their rear ends against the rear walls of the supplementary chambers 30—30'.

The housing 16 is preferably supported on the car sills 34, attached thereto by the bolts 35, and in turn supports the car floor, with the resulting elimination of channels, I-beams, or other supporting members ordinarily used for this purpose.

The operation of the buffing mechanism is as follows: When the buffing plate 2 makes contact with the buffer of an approaching car it is forced rearwardly against the pressure of the springs 6, 7 and 8 until it occupies the position shown in Fig. 1. The buffing pressures which exceed the amount necessary to compress the springs to this extent are then transmitted through direct contact of the central stem or plunger 4 with the front follower 15, which is caused to move rearwardly, driving its rearward extension back into the chamber 18. The follower 15 transmits its pressure by a wedging action to the foremost set of segments 20, and this pressure is transmitted from one to the other throughout the entire series of cones and segmental rings, and the entire series is caused to move rearwardly within the casing as the front follower 15 enters the forward end of the casing, carrying with it the equalizer follower 22, the rearward movement of which is resisted by the springs 33—33' which bear forwardly against the heads 31—31', and this resistance is transmitted through the equalizer follower 22 to the rearmost set of segments to the cones and the other sets of segments, causing a powerful frictional engagement between the exterior surface of the segmental rings 20 and the entire cylindrical surface 19 of the casing, thus exhausting the force of the buffing shock. This frictional engagement of the segments 20 and the interior surface of the casing increases progressively, since, as the cones and the segments move rearwardly in the casing, the springs 33—33' bear with increasing pressure on the heads 31—31', and this pressure is transmitted through the equalizer 22 to the various frictional members as described.

After buffing, the releasing action of the spring 25 drives the sleeve 24 forwardly and with it the front follower 15, thus releasing the wedging engagement between the follower 15 and the foremost segmental ring 20. The shoulder 26 of the sleeve 24 then strikes the foremost cone 21 and releases it from wedging engagement with the set of segments immediately to the rear. As the greatest amount of pressure is exerted in the forward part of the casing, it is not necessary to positively release the wedging engagement between the cones and segments farther to the rear, since they will automatically release themselves when the wedging engagement of the foremost cones and segments has been relieved. The action of the springs 6 and 8 also assists in restoring the buffer plate to its normal position.

Many changes may be made in the construction and operation of the mechanism which I have described and shown herein, without departing from my invention.

What I claim is:—

1. In a shock absorbing mechanism, a friction member rigidly secured to the car structure, sets of friction shoes in sliding contact with said friction member wedges engaging said shoes, said wedges and shoes being arranged alternately and in tandem, and the outermost wedge having a pocket therein, a plunger in engagement with the buffer plate, and adapted to enter said pocket, and a spring in said pocket engaging the plunger member.

2. In a shock absorbing mechanism, a casing rigidly attached to the car structure having frictional parts therein, supplemental chambers external of the casing, compression springs in said chambers, and means for transmitting pressure from the compression springs to said frictional parts to cause them to bear against the casing with a wedging frictional engagement.

3. In a shock absorbing mechanism, a casing rigidly attached to the car structure and having frictional parts therein, means for wedging the frictional parts against the casing, and a spring member for releasing the wedging engagement of the friction parts, said spring member having a bearing at one end against the wedging means and at its other end against a movable abutment, and moving during buffing in unison with the friction parts, said spring member being normally under initial compression and being adapted to release the friction parts by means of its initial compression.

4. In shock absorbing mechanism, in combination, a friction chamber, fixed spring chambers at the sides thereof, and a movable spring chamber, friction mechanism within the friction chamber, springs within the spring chambers, the movable spring chamber being adapted to connect the friction mechanism with the springs within the fixed spring chambers.

5. In shock absorbing mechanism, in combination, a friction chamber, fixed spring chambers at the sides thereof, a movable spring chamber adapted to reciprocate within the friction chamber, friction mechanism within the friction chamber, springs within the spring chambers, and means for connecting the movable spring chamber with the springs within the fixed spring chambers.

6. In shock absorbing mechanism, in combination, a friction chamber, spring chambers adjacent thereto, friction mechanism within the friction chamber, springs within the spring chambers, a movable spring chamber connecting said springs to said friction mechanism, and a releasing spring within the movable spring chamber adapted for a bodily rearward movement with the spring chamber.

7. In shock absorbing mechanism, in combination, a friction chamber, spring chambers at the sides thereof, friction mechanism within the friction chamber, springs within said spring chambers, a movable spring chamber connected to said springs, and a spring member within the movable spring chamber, said movable spring chamber having a hollow member adapted to extend within the friction chamber and to transmit pressure from the friction mechanism to the first-named spring chambers.

8. In shock absorbing mechanism, in combination, a friction chamber, fixed spring chambers at the sides thereof, friction mechanism within the friction chamber, springs within the spring chambers, a movable spring chamber, a spring member therein, said spring member engaging the friction mechanism, the said movable spring chamber having arms, and means connecting the springs within the fixed spring chambers to said arms.

9. In shock absorbing mechanism, in combination, a friction chamber, fixed spring chambers at the sides thereof and substantially co-extensive therewith, friction mechanism within the friction chamber, springs within the spring chambers, a mechanism connecting said springs with the friction members, said mechanism comprising a movable spring chamber, a spring member within the same, and arms extended from said chamber, the spring member within the movable spring chamber being adapted to restore the friction mechanism to normal position, and the arms being adapted to thereupon compress the springs within the fixed spring chambers.

10. In shock absorbing mechanism, a shell, said shell having a friction chamber and fixed spring chambers at the sides thereof, and substantially coextensive therewith, friction mechanism within the friction chamber, springs within the spring chambers, a recess in said shell at the ends of the said friction and spring chambers, a movable spring chamber in said recess and extending into the friction chamber, springs within the movable spring chamber, said springs engaging the friction mechanism, and means connecting the movable spring chamber with the springs within the fixed spring chambers.

11. In shock absorbing mechanism, a shell, friction mechanism within the shell, a movable spring chamber, a spring within the same, said spring being in engagement with the friction mechanism, springs within the shell, and means connecting said last-mentioned springs to the movable spring chamber, the spring within the movable spring chamber being adapted to assist in restoring the friction mechanism to normal position.

12. In shock absorbing mechanism, a shell having a friction chamber and fixed spring chambers at the sides of the friction chamber and substantially coextensive therewith, friction mechanism within the friction chamber, springs within the spring chambers, a movable spring chamber, springs within the same, bolts passing through the fixed spring chambers and operatively connected with the springs therein, the said movable spring chamber being provided with arms engaging said bolts.

13. In shock absorbing mechanism, in combination, a friction chamber, springs at the sides thereof, a movable spring chamber, friction mechanism within the spring chamber, a spring within the spring chamber, the movable spring chamber being adapted to connect the friction mechanism with the first mentioned springs.

ERNEST H. SCHMIDT.

Witnesses:
R. L. LEHMAN,
HARRY E. ORR.